(12) United States Patent
Kogure et al.

(10) Patent No.: US 7,058,541 B2
(45) Date of Patent: Jun. 6, 2006

(54) DEVICE FOR A VEHICLE FOR ESTIMATING FRICTION COEFFICIENT OF A ROAD SURFACE

(75) Inventors: Masaru Kogure, Tokyo (JP); Koji Matsuno, Tokyo (JP); Katsufumi Ichikawa, Tokyo (JP); Takayuki Ushijima, Tokyo (JP); Yutaka Hiwatashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/847,657

(22) Filed: May 18, 2004

(65) Prior Publication Data

US 2004/0267492 A1   Dec. 30, 2004

(30) Foreign Application Priority Data

May 22, 2003   (JP) ............................. 2003-145237

(51) Int. Cl.
   *G06F 19/00*   (2006.01)
(52) U.S. Cl. ........................................ 702/182; 701/80
(58) Field of Classification Search ................ 702/182, 702/183–185, 188; 701/65, 80
   See application file for complete search history.

(56) References Cited

U.S. PATENT DOCUMENTS 5,839,535 A   11/1998   Arai 5,929,534 A * 7/1999 Pickett ...................... 307/10.1
6,556,912 B1   4/2003   Matsuno

FOREIGN PATENT DOCUMENTS

| EP | 1 302 378 A | 4/2003 |
|----|-------------|--------|
| JP | 7-186989 | 7/1995 |
| JP | 8-2274 | 1/1996 |
| JP | 11-139293 | 5/1999 |

* cited by examiner

*Primary Examiner*—Marc S. Hoff
*Assistant Examiner*—Edward Raymond
(74) *Attorney, Agent, or Firm*—McGinn IP Law Group, PLLC

(57) ABSTRACT

A correlation coefficient computing unit receives front-left and front-right wheel-accelerations from high-pass filters, each having a driver-operating component removed therefrom, and computes a correlation coefficient therebetween. A computing-unit of upper and lower limits of a correlation coefficient of a population sets upper and lower limits of a correlation coefficient of a population. First and second correction-gain setting units set first and second correction-gains varying in accordance with running and driving states, respectively. A correlation coefficient computing unit of a population computes a correlation coefficient of a population of this time based on the correlation coefficients computed as above, a correlation coefficient of a population of the previous time, the upper and lower limits, and the first and second correction-gains. A coefficient of friction on road surface estimating unit estimates a coefficient of friction on road surface by comparing the correlation coefficient of the population of this time with a determining threshold value previously set according to the running state.

15 Claims, 8 Drawing Sheets

DEVICE FOR A VEHICLE FOR ESTIMATING FRICTION COEFFICIENT OF A ROAD SURFACE

This application claims benefit of Japanese Application No. 2003-145237 filed on May 22, 2003, the contents of which are incorporated by this reference.

BACKGROUND OF THE INVENTION

1. Field of the Invention

The present invention relates to a device for estimating a friction coefficient on road surface of a vehicle in order to accurately estimate the friction coefficient on road surface of a vehicle running on a road.

2. Description of the Related Art

In recent years, a variety of control techniques of a vehicle such as a traction control, a braking force control, and a torque distribution control have been proposed and put in practice. In many of these techniques, a friction coefficient on road surface is used for computing or correcting necessary control parameters and is therefore needed to be accurately estimated in order to reliably perform these controls.

Japanese Unexamined Patent Application Publication No.7-186989 discloses such a technique for estimating a friction coefficient on road surface, in that a deviation of a lateral acceleration which is a difference between an estimated lateral acceleration on the basis of an actual yaw rate of a yaw rate sensor and an actual lateral acceleration of a lateral acceleration sensor is computed, and it is estimated that a friction coefficient on road surface becomes smaller as the deviation of a lateral acceleration becomes greater.

Also, Japanese Unexamined Patent Application Publication No. 8-2274 discloses a technique in that an adaptive control theory is introduced so as to estimate a friction coefficient on road surface on the basis of an equation of motion of a lateral motion of a vehicle by using an angle of steering wheel, a vehicle speed, a yaw rate, and so forth.

Unfortunately, with the technique disclosed in Japanese Unexamined Patent Application Publication No. 7-186989, since estimation accuracy of a friction coefficient on road surface is susceptive to a resolution and noises of each sensor, the sensor has to meet many requirements, for example, its zero-point is effectively corrected, and it is shielded and is fixed at a proper position, in order to maintain a highly accurate output state.

Also, with the technique disclosed in Japanese Unexamined Patent Application Publication No. 8-2274, since a variation of the dynamic characteristic of a vehicle motion due to a difference in friction coefficients on road surface is in principal used, a friction coefficient on road surface is difficult to be detected without a vibratory steering input.

In view of the above problems, the present invention has been made. Accordingly, it is an object of the present invention to provide a device for estimating a friction coefficient on road surface of a vehicle, which minimizes influences of a resolution of a sensor, zero-point correction, noises, and the like, and which accurately estimates the friction coefficient on road surface without a vibratory steering input.

SUMMARY OF THE INVENTION

A device for estimating a friction coefficient on road surface of a vehicle includes first parameter-acquiring means finding a parameter indicating a driving behavior of the vehicle as a first parameter; second parameter-acquiring means finding a parameter corresponding to the first parameter as a second parameter, with a different method from that of the first parameter-acquiring means; correlation coefficient computing means statistically computing a correlation coefficient between the first and second parameters; population correlation coefficient computing means computing a correlation coefficient of a population of the correlation coefficients computed by the correlation coefficient computing means; and friction coefficient on road surface estimating means estimating a friction coefficient on road surface on the basis of the correlation coefficient of the population.

The above and other objects, features and advantages of the invention will be more clearly understood from the following description referring to the accompanying drawings.

DESCRIPTION OF THE PREFERRED EMBODIMENTS

An embodiment of the present invention will be described with reference to FIGS. 1 to 9.

Figure 1:
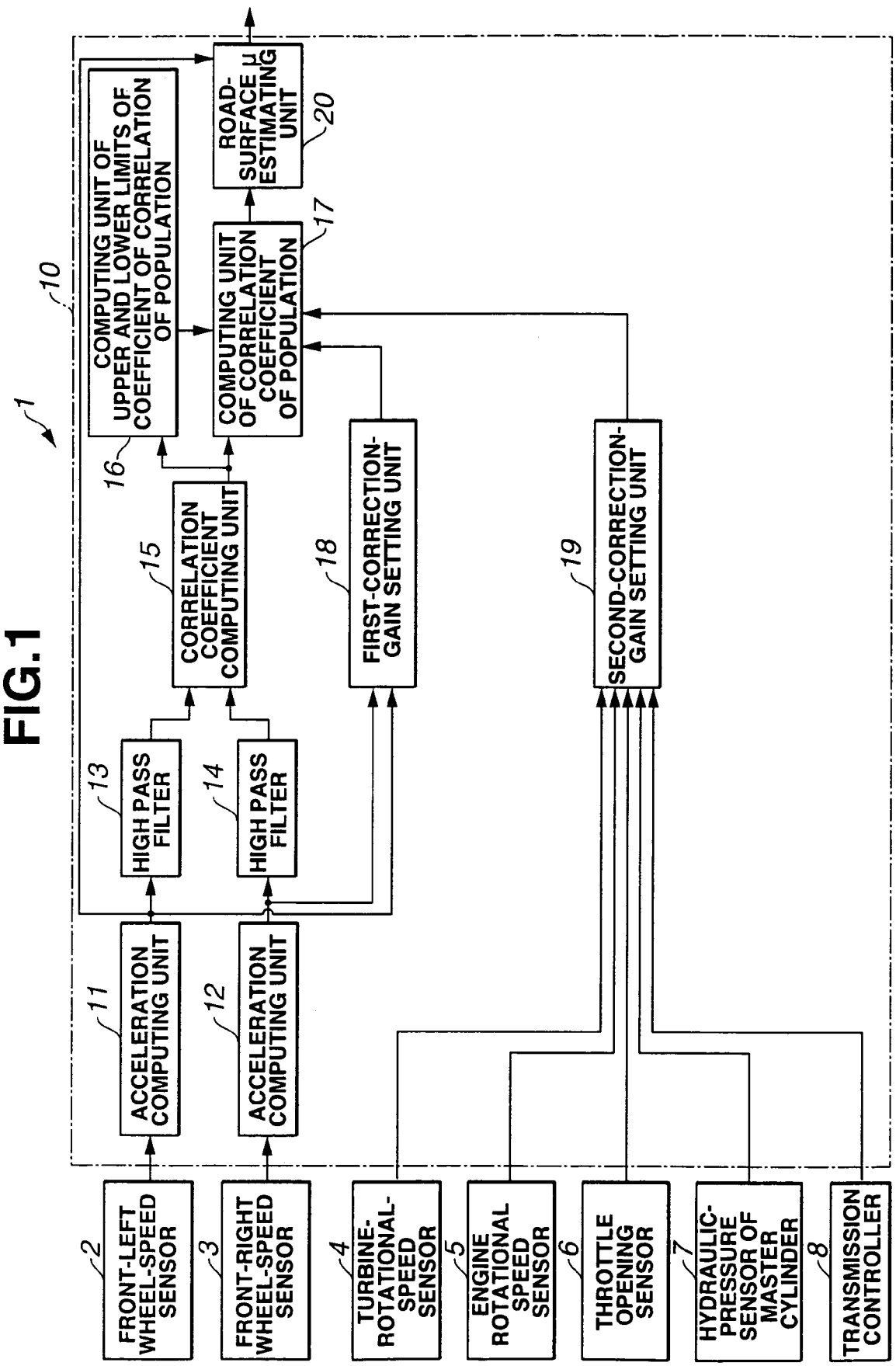
FIG. 1 is a functional block diagram illustrating the structure of a device for estimating a friction coefficient on road surface of a vehicle.

As shown in FIG. 1, a friction coefficient on road surface estimating device 1 for estimating a friction coefficient on road surface (hereinafter, friction coefficient on road surface is simply referred to as road-surface μ) includes a controlling unit 10, to which front-left and front-right wheel-speed sensors 2 and 3 are connected, and into which front-left wheel-speeds $\omega_{fl}$ and front-right wheel-speeds $\omega_{fr}$ are inputted. Also, the controlling unit 10 has a turbine-rotational-speed sensor 4 of a torque converter (not shown) of an automatic transmission connected thereto and receives a turbine-rotational-speed $N_t$. In addition, the controlling unit 10 has an engine-rotational-speed sensor 5, a throttle-opening sensor 6, and a hydraulic-pressure sensor 7 of a master cylinder connected thereto, and receives an engine-rotational-speed $N_e$, a throttle-opening $\theta_{th}$, and a hydraulic pressure $P_{MC}$ of the master cylinder, respectively. Furthermore, the controlling unit 10 receives a transmission gear-ratio $r_g$ from a transmission control system 8.

The controlling unit 10 is formed by a microcomputer and its peripheral circuits, that is, mainly formed by acceleration computing units 11 and 12, high-pass filters 13 and 14, a correlation coefficient computing unit 15, a computing unit 16 of upper and lower limits of a correlation coefficient of a population, a computing unit 17 of a correlation coefficient of a population, first- and second-correction-gain setting units 18 and 19, and a road-surface-μ estimating unit 20.

The acceleration computing unit 11 receives the front-left wheel-speed $\omega_{fl}$ from the front-left wheel-speed sensor 2, computes a front-left wheel-acceleration $d\omega_{fl}/dt$ as a differential value of the front-left wheel-speed $\omega_{fl}$, and outputs it to the high-pass filter 13, the first-correction-gain setting unit 18, and the road-surface-μ estimating unit 20.

The acceleration computing unit 12 receives the front-right wheel-speed $\omega_{fr}$ from the front-right wheel-speed sensor 3, computes a front-right wheel-acceleration $d\omega_{fr}/dt$ as a differential value of the front-right wheel-speed $\omega_{fr}$, and outputs it to the high-pass filter 14, and the first-correction-gain setting unit 18.

The high-pass filter 13 receives the front-left wheel-acceleration $d\omega_{fl}/dt$ from the acceleration computing unit 11, cuts low frequency components thereof, for example, those lower than about 1 Hz, and outputs it to the correlation coefficient computing unit 15.

The high-pass filter 14 receives the front-right wheel-acceleration $d\omega_{fr}/dt$ from the acceleration computing unit 12, cuts low frequency components thereof, for example, those lower than about 1 Hz, and outputs it to the correlation coefficient computing unit 15.

Figure 2B:
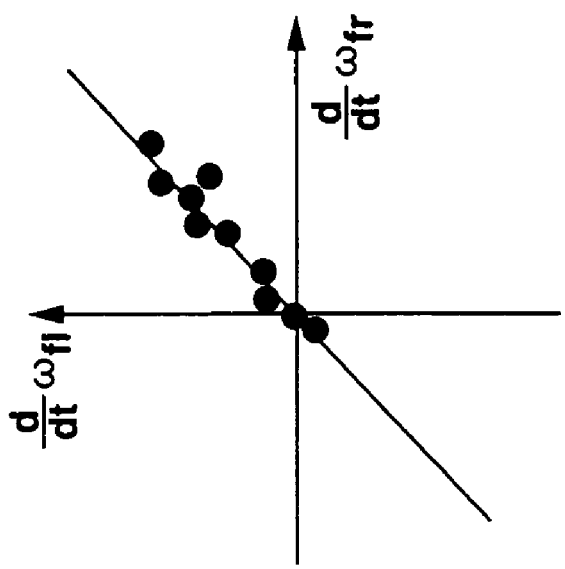
FIG. 2 illustrates the correlation between accelerations of right and left front wheels, including variation components of corresponding wheel speeds due to a driving operation of the vehicle.
Figure 2A:
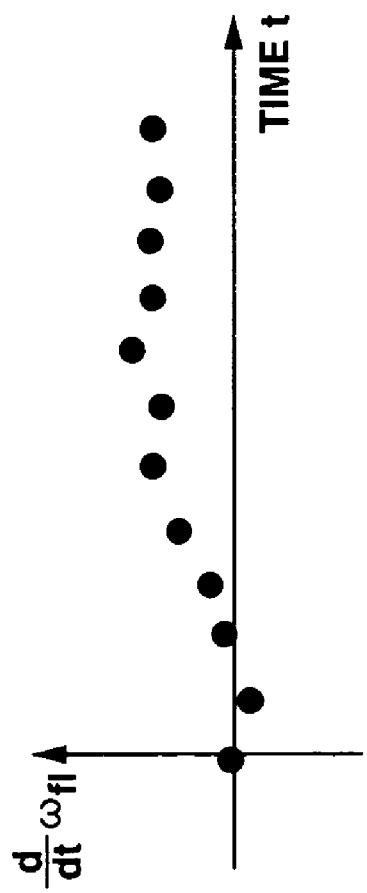
Figure 3B:
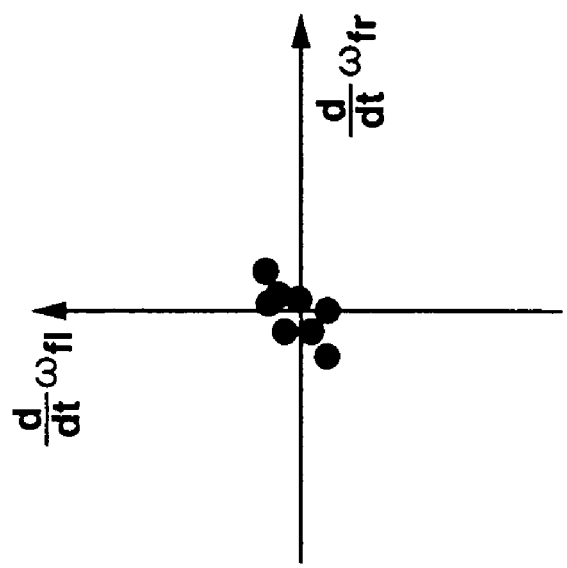
FIG. 3 illustrates the correlation between accelerations of right and left front wheels, removing the variation components of the corresponding wheel speeds due to the driving operation of the vehicle.
Figure 3A:
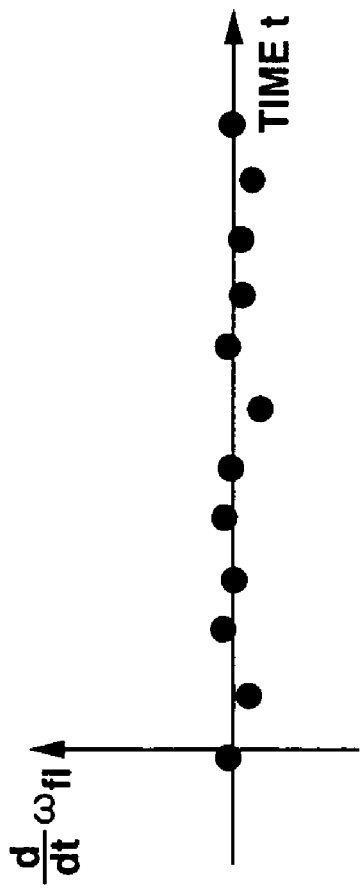

More particularly, as shown in FIG. 2A, when an acceleration or deceleration of a vehicle is great, a variation of a wheel acceleration in accordance with a driving operation of a driver is greater than a variation component of the same due to a road surface state. As shown in FIG. 2B, a correlation coefficient between wheel accelerations of two wheels tends to come closer to a high value (=1) regardless of a difference in road surface states. Since a variation of a wheel speed caused a driving operation of a driver lies in a very low frequency range (generally equal to or lower than 1 Hz) in comparison to that of a variation of the wheel speed due to a difference in road surface states, as shown in FIGS. 3A and 3B, the low frequency components are cut by the high-pass filters 13 and 14, hence the variation component of the wheel speed of each wheel caused by a driving operation of a vehicle is removed so as to accurately find the correlation of the variations of the wheel speeds due to a difference in road surface states.

As described above, according to the present embodiment, the front-left wheel-speed sensor 2, the acceleration computing unit 11, and the high-pass filter 13 make up first (second) parameter-acquiring means, and the front-right wheel-speed sensor 3, the acceleration computing unit 12, and the high-pass filter 14 make up second (first) parameter-acquiring means.

Although a correlation is found with respect to the front right and left wheels in the present embodiment, it may be found with respect to rear right and left wheels. As described above, either a pair of right and left front or rear wheels are used, because, when a pair of front and rear right or left wheels are used by way of example, a difference in the wheel speeds at the time of turning of a vehicle is included in the correlation, and also, when a four-wheel-drive vehicle is driven by way of example, an influence of an engaging state of a center differential and the like are included in the correlation.

In addition, wheel accelerations are used in place of wheel speeds, because, especially when the wheel speeds become high, the variation components of the wheel speeds become smaller relative to the wheel speeds, and also the variation components due to a difference in road surface states are unlikely detected.

Also, although the variation components of the wheel speeds due to a driving operation of a vehicle are removed by the high-pass filters 13 and 14 in the present embodiment, instead of this filtering process, the above removal may be performed by subtracting a driver-operating component $v_d$, estimated by the following equation (1), of a wheel speed from the wheel speed:

$$v_d = R_w \cdot (N_e \cdot r_v)/(r_g \cdot r_f) \qquad (1),$$

where, $R_w$ represents an effective radius of a tire, $r_v$ is a speed ratio ($=N_t/N_e$) of a torque converter, and $r_f$ represents a final gear ratio.

The correlation coefficient computing unit 15 receives the front-left and front-right wheel-accelerations $d\omega_{fl}/dt$ and $d\omega_{fr}/dt$ filtered by the high-pass filters 13 and 14, respectively, computes a correlation coefficient $r_{xy}$ in accordance with the following equation (2), and outputs it to the computing units 16 and 17.

More particularly, when two variables are defined by x and y (in the present embodiment, filtered front-left and front-right wheel-accelerations $d\omega_{fl}/dt$ and $d\omega_{fr}/dt$) for statistically finding a correlation coefficient, the correlation coefficient $r_{xy}$ is generally found by the following equation:

$$r_{xy} = S(x, y)/(S(x, x) \cdot S(y, y))^{1/2}, \qquad (2)$$

where, $$S(x, x) = \sum (x - x_h)^2$$

$$S(y, y) = \sum (y - y_h)^2$$

$$S(x, y) = \sum (x - x_h) \cdot (y - y_h)$$

$$x_h = (1/n) \cdot \sum (x) \text{ and}$$

$$y_h = (1/n) \cdot \sum (y),$$

(meanwhile, in the above equations, Σ means that the above adding process is executed n times corresponding to n pieces of data).

When the two variables are linearly correlated, uncorrelated, or reversely correlated, the correlation coefficient $r_{xy}$ found as described above is equal to 1, zero, or −1, respectively. Meanwhile, "reversely correlated" means the relationship between the two variables where, when one increases, the other decreases.

Although the correlation coefficient $r_{xy}$ can be more accurately computed as the number of sampling data becomes greater, since a correlation coefficient between any two of variables differs from one another depending on driving conditions of a vehicle or a road surface state, an excessive number of data leads to computation of an inappropriate value which is less responsive and does not properly reflect an actual state. Accordingly, as will be described later, in practice, by using data obtained in a very limited short period, a correlation coefficient which would be obtained in the assumption that a vehicle is running for a long period of time under the same conditions is estimated.

As described above, the correlation coefficient computing unit 15 is provided as correlation coefficient computing means.

The computing unit 16 receives the correlation coefficient $r_{xy}$ from the correlation coefficient computing unit 15, computes upper and lower limits $\rho_U$ and $\rho_L$ of a correlation coefficient of a population in accordance with the following equations (3) and (4), and outputs them to the computing unit 17.

Since the correlation coefficients exhibit a so-called redistribution, the distribution is first approximated a normal distribution with Fisher's z-transformation. When $r_{xy}$ is subjected to the z-transformation, Zr is found by the following equation:

$$Zr = (1/2) \cdot ln((1+r_{xy})/(1-r_{xy})).$$

Under the condition of a confident coefficient $\alpha$, an upper limit ZU and a lower limit ZL to be determined are found by the following equations:

$$ZU = Zr + u(\alpha)/(n-3)^{1/2} \text{ and}$$

$$ZL = Zr - u(\alpha)/(n-3)^{1/2},$$

where, $u(\alpha)$ is a fixed value found from the confident coefficient $\alpha$ when the normal distribution is assumed, and n represents the number-of sampling data.

Then, with the z-inverse transformation, the upper and lower limits $\rho_U$ and $\rho_L$ of a correlation coefficient $\rho$ of the population are given by the following equations (3) and (4):

$$\rho_U = (e^{2ZU} - 1)/(e^{2ZU} + 1) \tag{3}$$

$$\rho_L = (e^{2ZL} - 1)/(e^{2ZL} + 1) \tag{4},$$

where, e is a base of a natural logarithm.

Figure 4A:
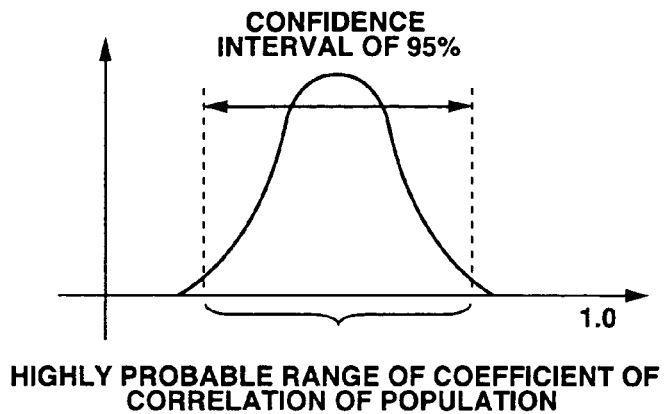
FIG. 4 illustrates a confidence interval of a correlation coefficient of a population and the number of samples.
Figure 4B:
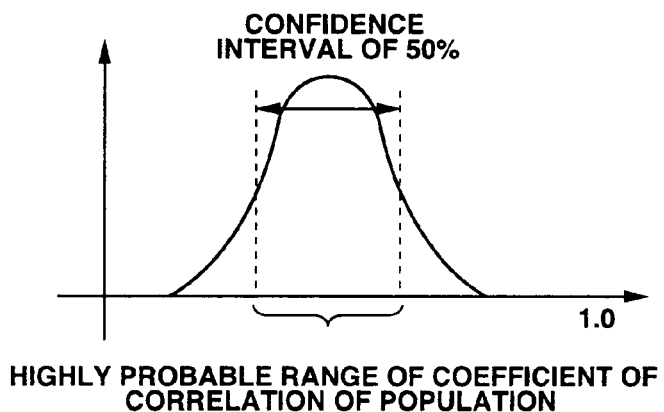
Figure 4C:
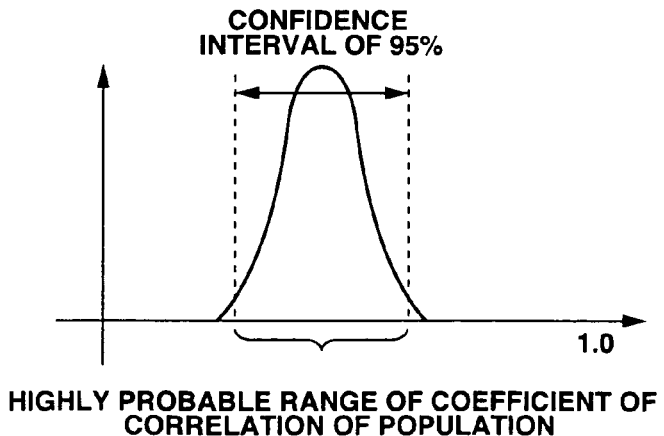
Figure 5:
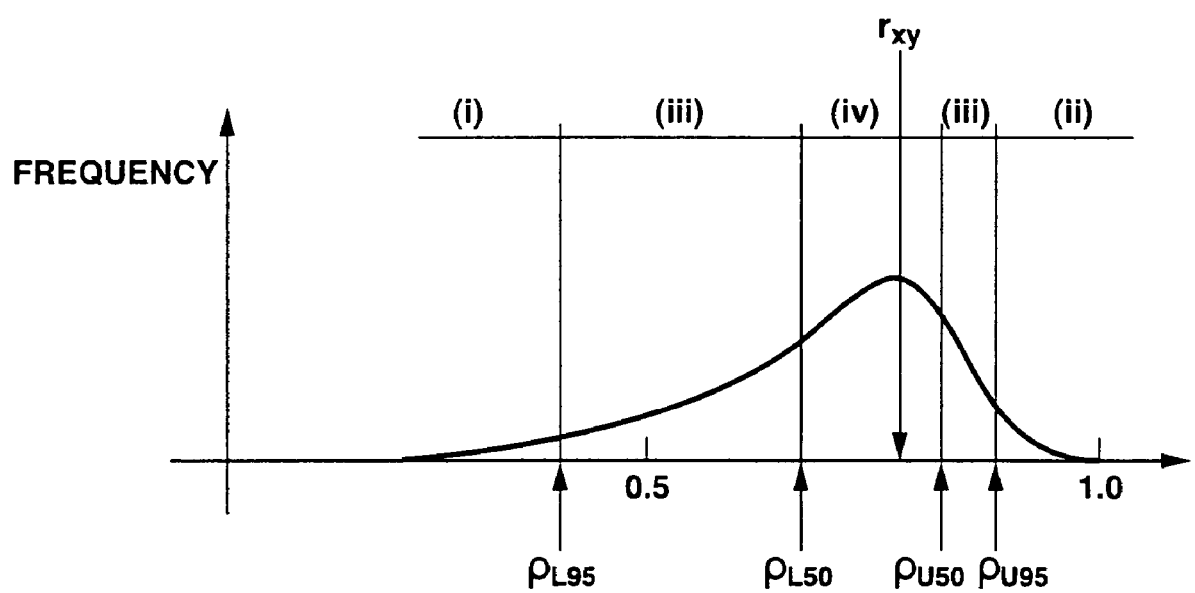
FIG. 5 illustrates each region for computing a correlation coefficient of a population of this time.

As shown in FIG. 4A, when the confident coefficient a is set at 0.95, the correlation coefficient of the population exists between the upper and lower limits $\rho_U$ and $\rho_L$ of the correlation coefficient $\rho$ of the population found on the basis of the above confident coefficient, with a probability of 95%. As shown in FIG. 4B, the smaller the set value of the confident coefficient $\alpha$, the width between the upper and lower limits $\rho_U$ and $\rho_L$ of the correlation coefficient $\rho$ of the population becomes narrower. Also, as shown in FIG. 4C, the greater the number of sampling data, the width between the upper and lower limits $\rho_U$ and $\rho_L$ of the correlation coefficient $\rho$ of the population becomes narrower. The confident coefficient $\alpha$ and the number n of sampling data are previously set at appropriate values by experiment or the like.

The computing unit 17 receives the correlation coefficient $r_{xy}$ from the correlation coefficient computing unit 15, the upper and lower limits $\rho_U$ and $\rho_L$ of the correlation coefficient $\rho$ of the population from the computing unit 16, and first and second correction gains K1 and K2, which will be described later, from the first and second-correction-gain setting units 18 and 19, respectively. Thus, a correlation coefficient $\rho_i$ of a population of this time is found as described below and is outputted to the road-surface-μ estimating unit 20.

When a correlation coefficient of a population obtained in the previous cycle (i-1) is defined by $\rho_{i-1}$; a correlation coefficient sampling data obtained in this cycle (i) is defined by $r_{xy}$; upper and lower limits of the correlation coefficient $\rho$ of the population found on the basis of the confident coefficient of 95% (i.e., $\alpha = 0.95$) are respectively defined by $\rho_{U95}$ and $\rho_{L95}$; and upper and lower limits of the correlation coefficient $\rho$ of the population found on the basis of the confident coefficient of 50% (i.e., $\alpha = 0.50$) are respectively defined by 92 $_{U50}$ and $\rho_{L50}$, the correlation coefficient $\rho_i$ of the population of this time is computed in accordance with corresponding one of the following four cases.

(1) With the condition: $\rho_{i-1} < \rho_{L95}$ (in the case of the region (i) in FIG. 5)

$$\rho_i = \rho_{i-1} + K1 \cdot (\rho_{L95} - \rho_{i-1}) \tag{5},$$

where, the first correction gain K1 is a constant of zero or 1, depending on the driving state of a driver, which will be described later.

(2) With the condition: $\rho_{i-1} > \rho_{U95}$ (in the case of the region (ii) in FIG. 5)

$$\rho_i = \rho_{i-1} + K1 \cdot (92_{U95} - \rho_{i-1}) \tag{6}.$$

(3) With the condition: $\rho_{L95} \leq \rho_{i-1} \leq \rho_{L50}$, or $\rho_{U50} \leq \rho_{i-1} \leq \rho_{U95}$ (in the case of the region (iii) in FIG. 5)

$$\rho_i = \rho_{i-1} + K1 \cdot K2 \cdot (r_{xy} - \rho_{i-1}) \cdot dt/T_1 \tag{7},$$

where, the second correction gain K2 is a constant falling in a range between zero to 1, which varies in accordance with a running state of a vehicle as will be described later, and dt and $T_1$ represent a sampling time and a time constant, respectively. With this arrangement, in the case of (3), the correlation coefficient $\rho_{i-1}$ of the previous population is made closer to $r_{xy}$ in accordance with the equation (7).

(4) With the condition: $\rho_{L50} < \rho_{i-1} < \rho_{U50}$ (in the case of the region (iv) in FIG. 5)

$$\rho_i = \rho_{i-1} + K1 \cdot K2 \cdot (r_{xy} - \rho_{i-1}) \cdot dt/T_2 \tag{8},$$

where, $T_2$ is a time constant ($T_1 > T_2$). With this arrangement, in the case of (4), the correlation coefficient $\rho_{i-1}$ of the previous population is made closer to $r_{xy}$ in accordance with the equation (8).

Figure 6:
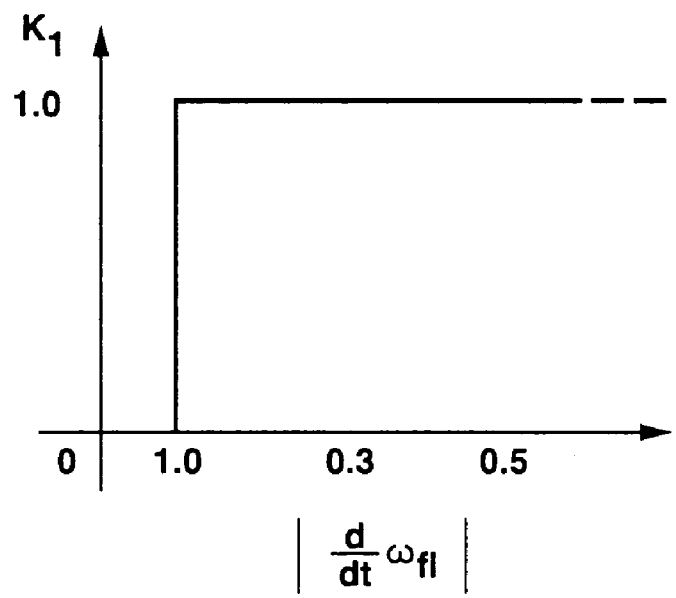
FIG. 6 illustrates the characteristic of a map of a first correction gain.

The first-correction-gain setting unit 18 receives the front-left wheel-acceleration $d\omega_{fl}/dt$ from the acceleration computing unit 11 and the front-right wheel-acceleration $d\omega_{fr}/dt$ from the acceleration computing unit 12, finds the first correction gain K1 in accordance with these accelerations by referring to a map, for example, having a characteristic shown in FIG. 6, and outputs it to the computing unit 17.

The first correction gain K1 is set so as to be a constant which varies in accordance with the driving state of a driver. When a variance of each parameter used for computing a correlation coefficient is not greater than a resolution of the corresponding sensor, since the S/N ratio of a signal due to the variance is very low, the first correction gain K1 is set at zero.

For example, when a wheel acceleration is found on the basis of a signal of the wheel speed sensor, which is updated every 20 msec and has a resolution of 0.0625 km/h/LSB, a resolution of the wheel acceleration is given as shown below:

$$0.0625/3.6/0.02 = 0.868 \ (m/sec^2),$$

hence, a signal having a magnification not greater than about 0.1 G (=0.1×0.98 (m/sec$^2$)) is not greater than a resolution of the corresponding sensor, whereby the S/N ratio of the signal is very low. Accordingly, as shown in FIG. 6, the first correction gain K1 is set such that a variation of a longitudinal acceleration not greater than 0.1 G is neglected.

The second-correction-gain setting unit 19 receives the turbine-rotational-speed $N_t$ from the turbine-rotational-speed sensor 4; the engine-rotational-speed $N_e$ from the engine-rotational-speed sensor 5; the throttle-opening $\theta_{th}$ from the throttle-opening sensor 6; the hydraulic pressure $P_{MC}$ of the master cylinder from the hydraulic-pressure sensor 7 of the master cylinder; and the transmission gear-ratio $r_g$ from the transmission control system 8. Then, the setting unit 19 computes a longitudinal acceleration $a_e$ of a vehicle on the basis of these inputs, finds the second correction gain K2 by referring to a map having a characteristic as shown in FIG. 7, in accordance with the longitudinal acceleration $a_e$, and output it to the computing unit 17.

Figure 7:
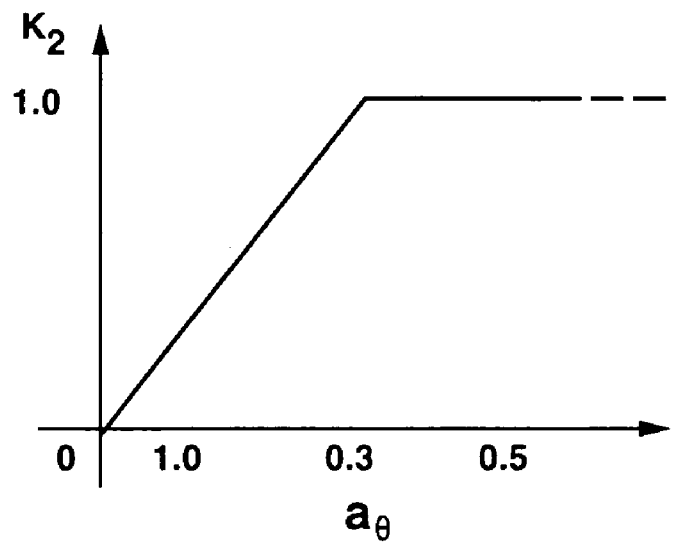
FIG. 7 illustrates the characteristic of a map of a second correction gain.

The second correction gain K2 is set so as to be a constant which varies in accordance with a running state of a vehicle, and, when the computed correlation coefficient has an apparently low correlation with the road surface state (for example, in the case of an apparently low S/N, or a small influence of the road surface state relative to a motion of a vehicle) with respect to $r_{xy}$, the second correction gain K2 which represents a degree reflecting to the correlation coefficient $\rho_i$ of the population of this time is decreased (K2<1) as shown by a characteristic diagram in FIG. 7. In a situation where a load is not exerted on a tire, the road-surface μ is unlikely affected on a motion of the vehicle, thereby resulting in a low S/N ratio. The second correction gain K2 is varied in a range from zero to 1 in accordance with the magnitudes of a braking force and a driving force estimated from an operation of a driver.

For example, when a longitudinal force computed taking account of an engine-transmission characteristic and a brake characteristic and exerted on a vehicle is defined by $F_x$ and the mass of the vehicle is defined by m, as shown in FIG. 7, the second correction gain K2 is varied in accordance with the longitudinal acceleration $a_e$ (=$F_x$/m) computed by $F_x$ and m. If a running resistance and a slope are not taken into account, the longitudinal acceleration $a_e$ is computed as described below, for example.

The longitudinal force $F_x$ estimated from an operation of a driver is the sum of an overall braking force $F_f$ and a driving force (or a reverse driving force) $F_e$ of an engine, that is, is given by the following equation:

$$F_x = F_f + F_e \quad (9).$$

The overall braking force $F_f$ is computed from a front-wheel braking force $F_{Ft}$ per wheel and a rear-wheel braking force $F_{Rr}$ per wheel in accordance with the following equation (10):

$$F_f = 2(F_{Ft} + F_{Rr}) \quad (10).$$

The front- and rear-wheel braking forces $F_{Ft}$ and $F_{Rr}$ are respectively found by the following equations (11) and (12):

$$F_{Ft} = (\pi Dwc^2/4) \cdot P_{Ft} \cdot C_{Ft} \cdot (Rb_{Ft}/R_w) \quad (11) \text{ and}$$

$$F_{Rr} = (\pi Dwc^2/4) \cdot P_{Rr} \cdot C_{Rr} \cdot (Rb_{Rr}/R_w) \quad (12),$$

where, Dwc represents an inner diameter of a wheel cylinder, $P_{Ft}$ and $P_{Rr}$ respectively represent hydraulic pressures of front- and rear-wheel brakes, $C_{Ft}$ and $C_{Rr}$ respectively represent front- and rear-wheel brake factors, and $Rb_{Ft}$ and $Rb_{Rr}$ respectively represent effective radii of front- and rear-wheel brake rotors. The front- and rear-wheel brake factors $C_{Ft}$ and $C_{Rr}$ are respectively computed from friction coefficients $\mu_{pFt}$ and $\mu_{pRr}$ of brake pads of the front and rear wheels in accordance with the following equations (13) and (14):

$$C_{Ft} = 2\mu_{pFt} \quad (13) \text{ and}$$

$$C_{Rr} = 2\mu_{pRr} \quad (14).$$

Figure 8:
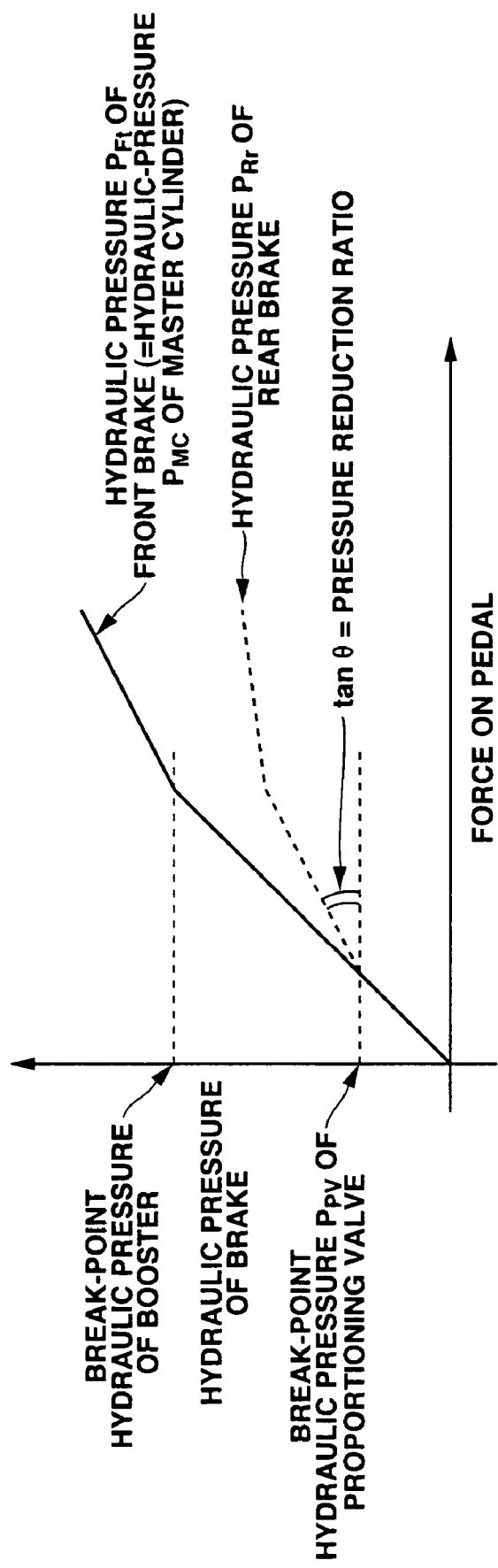
FIG. 8 illustrates a diagram for computing a braking force on the basis of a value of a hydraulic pressure sensor of a master cylinder.

As shown in FIG. 8, the hydraulic pressure $P_{Ft}$ of the front-wheel brake is the same as the hydraulic pressure $P_{MC}$ of the master cylinder, and the hydraulic pressure $P_{Rr}$ of the rear-wheel brake is different from about a break-point hydraulic pressure $P_{Pv}$ of a proportioning valve.

As a result, the following equations are obtained:

$$P_{Ft} = P_{MC} \quad (15)$$

$$P_{Rr} = F_{Ft} \quad (16) \text{ and}$$

$$P_{Rr} = P_{Pv} + (F_{Ft} - P_{Pv}) \cdot \tan \theta \quad (17),$$

(meanwhile, the equations (16) and (17) are respectively satisfied under the conditions: $F_{Ft} < P_{Pv}$ and $F_{Ft} \geq P_{Pv}$).

The driving force (or the reverse driving force) $F_e$ of the engine is computed by the following equation (18), taking account of the characteristic of the transmission:

$$F_e = (T_t \cdot r_f)/R_w \quad (18),$$

where, $T_t$ represents a torque which is produced after the transmission gear and found by the following equation (19), when an engine torque, and a torque ratio of and a power transmission efficiency of a torque converter are respectively defined by $T_e$, $t_{conv}$, and $\eta_t$:

$$T_t = T_e \cdot r_g \cdot t_{conv} \cdot \eta \quad (19),$$

where, the engine torque $T_e$ is found from a map previously set on the basis of the engine-rotational-speed $N_e$ and the throttle-opening $\theta_{th}$, and the torque ration $t_{conv}$ is found from a map previously set on the basis of a speed ratio $r_v$ (=$N_t/N_e$) of the torque converter.

When the overall braking force $F_f$ and the engine driving force (or the engine reverse driving force) $F_e$ are found as described above, the longitudinal force $F_x$ is found by summing the above forces in accordance with the foregoing equation (9), the longitudinal acceleration $a_e$ is found in an estimating manner from the longitudinal force $F_x$ and the mass m of the vehicle, and, by referring to the map shown in FIG. 7, the second correction gain K2 is found on the basis of the longitudinal acceleration $a_e$.

As described above, according to the embodiment of the present invention, the computing unit 16, the computing unit 17, and the first- and second-correction-gain setting units 18 and 19 make up population correlation coefficient computing means.

The road-surface-μ estimating unit 20 is provided so as to serve as friction coefficient on road surface estimating means, receives the front-left wheel-acceleration $d\omega_{fl}/dt$ from the acceleration computing unit 11 and the correlation coefficient $\rho_i$ of the population of this time from the computing unit 17, estimates the road-surface μ in accordance with a running state of a vehicle, and outputs it as an estimated value $\mu_i$ of the road-surface μ.

The road-surface-μ estimating unit 20 previously sets a determining threshold value for determining the road-surface μ so as to estimate the road-surface μ by comparing the determining threshold value and the correlation coefficient $\rho_i$ of the population of this time. Since the road surface state affects on the correlation coefficient $\rho_i$ of the population of this time in accordance with a running state of a vehicle, the determining threshold value is set in accordance with corresponding one of three situations (that is, (i) an accelerated state, (ii) a decelerated state, and (iii) a steadily running state). Also, the road-surface μ is determined in accordance with one of two kinds of roads, that is, a high-μ road (for example, an asphalt road) and a low-μ road (for example, a compressed-snow road or a gravel road).

When the average of n pieces of data of, for example, the front-left wheel-acceleration $d\omega_{fl}/dt$ (or the front-right wheel-acceleration $d\omega_{fr}/dt$) is not less than 0.1 G; is equal to −0.1 G or less; or lies between −0.1 G and 0.1 G, a running state of a vehicle is respectively determined as an accelerated state, a decelerated state, or a steadily running state.

That is, the average $(d\omega_{fl}/dt)_h$ of the wheel accelerations is found by the following equation:

$$(d\omega_{fl}/dt)_h = (1/n) \cdot \Sigma d\omega_{fl}/dt,$$

(meanwhile, $\Sigma$ means that the above adding process is executed n times corresponding to n pieces of data).

To be more specific, according to the present embodiment, the road-surface $\mu$ is estimated as follows in accordance with a running state.

(i) In the case of an accelerated state ($d\omega_{fl}/dt \geq 0.1$ G)

Since the road-surface $\mu$ is unlikely affected by the road surface state, the determining threshold value is not set, and the road-surface $\mu$ is not estimated.

(ii) In the case of a decelerated state ($d\omega_{fl}/dt \leq -0.1$ G)

By setting a compressed-snow road and an asphalt road (a dry road) as reference roads, high-$\mu$-road and low-$\mu$-road determining threshold values $\rho_{dH}$ and $\rho_{dL}$ are decided under the condition: $\rho_{dH} > \rho_{dL}$. Also, (a) with the condition: $\rho_i \geq \rho_{dH}$, the road state is determined as the high-$\mu$ road, and the estimated value $\mu_i$ of the road-surface $\mu$ is set at 1.0, (b) with the condition: $\rho_i \leq \rho_{dL}$, the road state is determined as the low-$\mu$ road, and the estimated value $\mu_i$ of the road-surface $\mu$ is set at 0.3, and (c) with the condition: $\rho_{dL} < \rho_i < \rho_{dH}$, the road-surface $\mu$ is not estimated, and the estimated value $\mu_i$ of the road-surface $\mu$ of this time is set at an estimated value $\mu_{i-1}$ of the road-surface $\mu$ of the previous time.

(iii) In the case of a steadily running state ($-0.1$ G $< d\omega_{fl}/dt < 0.1$ G)

By setting a compressed-snow road and an asphalt road (dry road) as reference roads, high-$\mu$-road and low-$\mu$-road determining threshold values $\rho_{SH}$ and $\rho_{SL}$ are decided under the condition: $\rho_{SH} > \rho_{SL}$. Also, similarly to the foregoing decelerated state (ii), (a) with the condition: $\rho_i \geq \rho_{SH}$, the road state is determined as the high-$\mu$ road, and the estimated value $\mu_i$ of the road-surface $\mu$ is set at 1.0, (b) with the condition: $\rho_i \leq \rho_{SL}$, the road state is determined as the low-$\mu$ road, and the estimated value $\mu_i$ of the road-surface $\mu$ is set at 0.3, and (c) with the condition: $\rho_{SL} < \rho_i < \rho_{SH}$, the road-surface $\mu$ is not estimated, and the estimated value $\mu_i$ of the road-surface $\mu$ of this time is set at the estimated value $\mu_{i-1}$ of the road-surface $\mu$ of the previous time.

Figure 9:
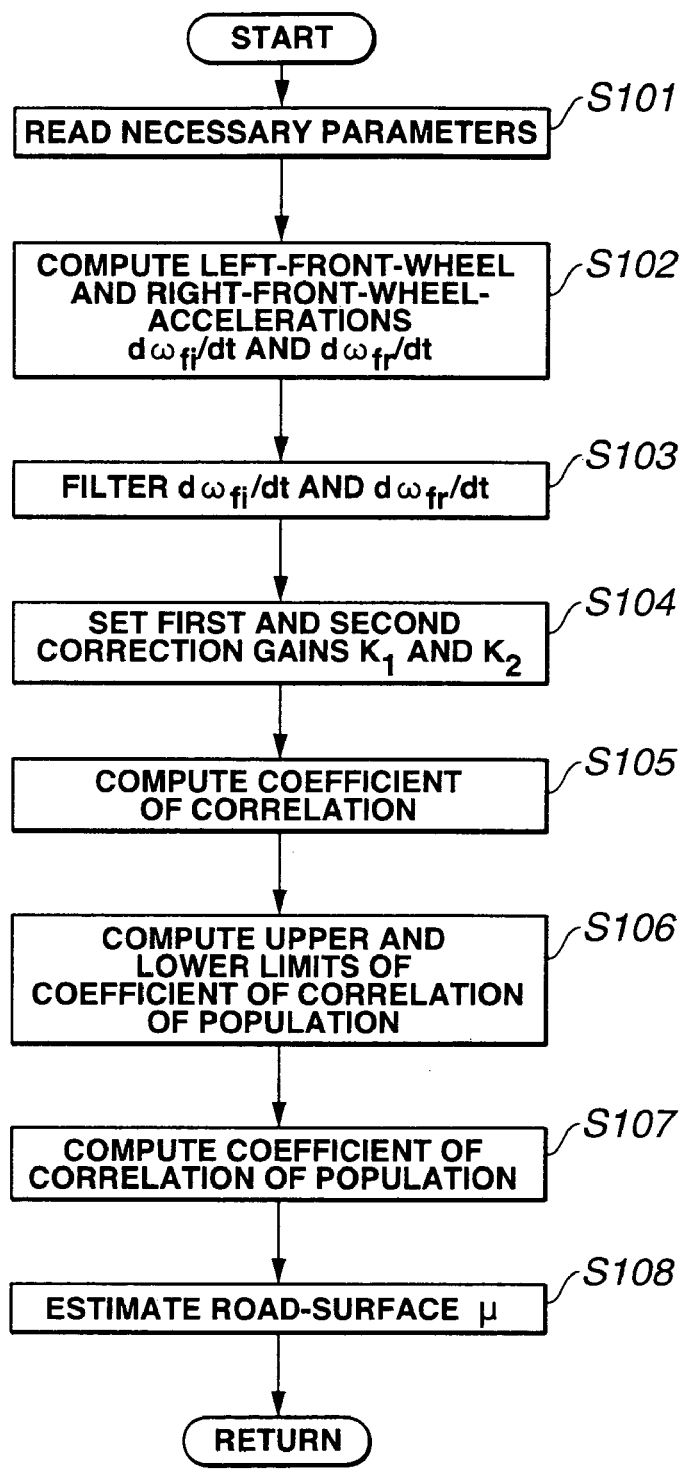
FIG. 9 is a flowchart for estimating a friction coefficient on road surface.

An operation of the device for estimating a friction coefficient on road surface of a vehicle, having the above-described structure, will be described in accordance with a flowchart shown in FIG. 9. In step S101, necessary parameters, that is, the front-left and front-right wheel-speeds $\omega_{fl}$ and $\omega_{fr}$, the turbine-rotational-speed $N_t$, the engine-rotational-speed $N_e$, the throttle-opening $\theta_{th}$, the hydraulic pressure $P_{MC}$ of the master cylinder, the transmission gear-ratio $r_g$, and so forth are read.

Next, the process moves to step S102, the front-left and front-right wheel-accelerations $d\omega_{fl}/dt$ and $d\omega_{fr}/dt$ are respectively computed by the acceleration computing units 11 and 12 of the controlling unit 10.

When the process moves to step S103, the front-left and front-right wheel-accelerations $d\omega_{fl}/dt$ and $d\omega_{fr}/dt$ are respectively filtered by the high-pass filters 13 and 14.

Then, the process moves to step S104, the first correction gain K1 is found by the first-correction-gain setting unit 18, by referring to a corresponding map, on the basis of the front-left and front-right wheel-accelerations $d\omega_{fl}/dt$ and $d\omega_{fr}/dt$. Also, the second correction gain K2 is found by the second-correction-gain setting unit 19, by referring to a corresponding map, on the basis of the longitudinal acceleration $a_e$.

When the process moves to step S105, the correlation coefficient $r_{xy}$ is computed by the correlation coefficient computing unit 15 from the filtered front-left and front-right wheel-accelerations $d\omega_{fl}/dt$ and $d\omega_{fr}/dt$ in accordance with the foregoing equation (2).

Then, the process moves to step S106, in accordance with the foregoing equation (3), the upper and lower limits $\rho_{U95}$ and $\rho_{U50}$ of the correlation coefficient of the population, respectively, under the conditions of the confident coefficients: $\alpha = 0.95$ and $0.50$, are computed by the computing unit 16 on the basis of the correlation coefficient $r_{xy}$. Also, in accordance with the foregoing equation (4), the lower limits $\rho_{L95}$ and $\rho_{L50}$ of the correlation coefficient of the population, under the conditions of the confident coefficients: $\alpha = 0.95$ and $0.50$, are computed by the same.

Subsequently, the process moves to step S107, on the basis of the correlation coefficient $r_{xy}$, the upper limits $\rho_{U95}$ and $\rho_{U50}$ and the lower limits $\rho_{L95}$ and $\rho_{L50}$ of the correlation coefficient of the population, and the first and second correction gains K1 and K2, the correlation coefficient $\rho_i$ of the population of this time is computed by the computing unit 17 in accordance with corresponding one of the foregoing four cases: (1) $\rho_{i-1} < \rho_{L95}$, (2) $\rho_{i-1} > \rho_{U95}$, (3) $\rho_{L95} \leq \rho_{i-1} \leq \rho_{L50}$ or $\rho_{U50} \leq \rho_{i-1} \leq \rho_{U95}$, and (4) $\rho_{U50}$.

When the process moves to step S108, from the average of n pieces of data of the front-left wheel-acceleration $d\omega_{fl}/dt$, a running state of a vehicle is determined as any one of the three situations: (i) an accelerated state, (ii) a decelerated state, and (iii) a steadily running state.

As a result, in the case (i) of an accelerated state ($d\omega_{fl}/dt \geq 0.1$ G), the determining threshold value is not set; in the case (ii) of a decelerated state ($d\omega_{fl}/dt \leq -0.1$ G), a compressed-snow road and an asphalt road (dry road) are set as reference roads, and the high-$\mu$-road and low-$\mu$-road determining threshold values $\rho_{dH}$ and $\rho_{dL}$ are decided; and in the case (iii) of a steadily running state ($-0.1$ G $< d\omega_{fl}/dt < 0.1$ G), a compressed-snow road and an asphalt road (dry road) are likewise set as reference roads, and the high-$\mu$-road and low-$\mu$-road determining threshold values $\rho_{SH}$ and $\rho_{SL}$ are decided. As described above, in accordance with a running state of a vehicle, by comparing each of the determining threshold values with the correlation coefficient $\rho_i$ of the population of this time, the corresponding road-surface $\mu$ is estimated.

As described above, according to the embodiment of the present embodiment, the correlation coefficient $r_{xy}$ is found from the front-left and -front-right wheel-accelerations $d\omega_{fl}/dt$ and $d\omega_{fr}/dt$, the correlation coefficient $\rho_i$ of the population of this time is found on the basis of the correlation coefficient $r_{xy}$, and the estimated value $\mu_i$ of the road-surface $\mu$ is estimated on the basis of the correlation coefficient $\rho_i$ of the population of this time. Hence, influences of a resolution and noises of each sensor are canceled and eliminated by statistical processing, whereby the road-surface $\mu$ resistant to such influences and a variation of a signal of the sensor is accurately estimated even without a vibratory steering input.

Although the correlation coefficient $r_{xy}$ is found from the front-left and front-right wheel-accelerations $d\omega_{fl}/dt$ and $d\omega_{fr}/dt$ in the embodiment of the present invention, alternatively, by finding the correlation coefficient $r_{xy}$ between the foregoing longitudinal acceleration $a_e$ and a longitudinal acceleration obtained from a signal of the wheel speed sensor, the road-surface $\mu$ may be estimated according to the same processing as described above, or by finding the correlation coefficient $r_{xy}$ between the foregoing longitudinal acceleration $a_e$ and a longitudinal acceleration obtained from a longitudinal acceleration sensor, the road-surface µ may be estimated according to the same processing as described above.

Still alternatively, the road-surface µ may be estimated by finding a yaw rate $d\psi/dt$ or a lateral acceleration $d^2y/dt^2$ of a vehicle in the manner as described below. In other words, when cornering forces of front and rear wheels, the mass of a vehicle, and a lateral acceleration are respectively defined by $F_f$ and $F_r$, m, and $d^2y/dt^2$, an equation of motion of a translational motion of a laterally moving vehicle is given by the following equation:

$$m \cdot d^2y/dt^2 = 2 \cdot F_f + 2 \cdot F_r \qquad (20).$$

Also, when distances of front and rear axles from the center of gravity of the vehicle, a yawing moment of inertia of a car body, and a yaw angular acceleration are respectively defined by $L_f$ and $L_r$, $I_z$, and $d^2\psi/dt^2$, an equation of motion of a rotational motion of the vehicle rotating about its center of gravity is given by the following equation:

$$I_z \cdot d^2\psi/dt^2 = 2F_f L_f - 2F_r \cdot L_r \qquad (21).$$

When a slip angle and a slip angular velocity of a car body, and a vehicle speed are respectively defined by $\beta$, $d\beta/dt$, and V, the lateral acceleration $d^2y/dt^2$ is expressed by the following equation:

$$d^2y/dt^2 = V(d\beta/dt + d\psi/dt) \qquad (22).$$

Each of the cornering forces is responsive approximately in the first-order delay with respect to a slip angle of a tire. When this delay is neglected, and the cornering force is also linearized by using an equivalent cornering power in which the characteristic of a suspension is incorporated into the characteristic of a tire, the cornering forces are expressed by the following equations:

$$F_f = -K_f \beta_f \qquad (23) \text{ and}$$

$$F_r = -K_r \cdot \beta_r \qquad (24),$$

where, $K_f$ and $K_r$ represent the equivalent cornering powers of the front and rear wheels, and $\beta_f$ and $\beta_r$ represent slip angles of the front and rear wheels.

As elements in the equivalent cornering powers $K_f$ and $K_r$, into which influences of a roll and the suspension are taken account, when a front-wheel steering angle is defined by $\delta_f$, the slip angles $\beta_f$ and $\beta_r$ of the front and rear wheels are simplified as below by using the yaw rate $d\psi/dt$:

$$\beta_f = \beta + L_f \cdot (d\psi/dt)/V - \delta_f \qquad (25) \text{ and}$$

$$\beta_r = \beta - L_r \cdot (d\psi/dt)/V \qquad (26).$$

An equation of state of a kinetic model of a vehicle motion expressed by the above-described equations is given as below:

$$dx(t)/dt = A \cdot x(t) + B \cdot u(t) \qquad (27)$$

$$x(t) = [\beta \ (d\psi/dt)]^T$$
$$u(t) = [\delta_f \ 0]^T$$

$$A = \begin{bmatrix} a11 & a12 \\ a21 & a22 \end{bmatrix}$$

$$B = \begin{bmatrix} b11 & b12 \\ b21 & b22 \end{bmatrix}$$

$a_{11} = -2(K_f + K_r)/(m \cdot V)$
$a_{12} = -1 - 2(L_f K_f - L_r \cdot K_r)/(m \cdot V^2)$
$a_{21} = -2(L_f K_f - L_r \cdot K_r)/I_z$
$a_{22} = -2(L_f^2 \cdot K_f + L_r^2 \cdot K_r)/(I_z \cdot V)$
$b_{11} = 2K_f/(m \cdot V)$
$b_{21} = 2L_f K_f/I_z$
$b_{12} = b_{22} = 0$.

By substituting the front-wheel steering angle $\delta_f$ and the vehicle speed V obtained from the wheel-speed sensor into the foregoing equation (27), an expression: $dx(t)/dt = [d\beta/dt \ d^2\psi/dt^2]^T$ is computed, and the yaw rate $d\psi/dt$, or the lateral acceleration $d^2y/dt^2$ is respectively found by corresponding one of the following equations:

$$d\psi/dt = \int (d^2\psi/dt^2) dt \qquad (28) \text{ and}$$

$$d^2y/dt^2 = V(d\beta/dt + d\psi/dt) \qquad (29).$$

Then, by finding the correlation coefficient $r_{xy}$ between the yaw rate $d\psi/dt$ found by the equation (28) and a sensor value of a yaw rate sensor, or alternatively, by finding the correlation coefficient $r_{xy}$ between the lateral acceleration $d^2y/dt^2$ found by the equation (29) and a sensor value of a lateral acceleration sensor, the road-surface µ may be estimated according to the same processing as described above.

Furthermore, by finding the correlation coefficient $r_{xy}$ between a lateral acceleration, estimated from the vehicle speed V obtained from the wheel-speed sensor and the sensor value of the yaw rate sensor, and the sensor value of the lateral acceleration sensor, the road-surface µ may be estimated according to the same processing as described above. Alternatively, by finding the correlation coefficient $r_{xy}$ between the yaw rate, estimated from the vehicle speed V obtained from the wheel-speed sensor and the sensor value of the lateral acceleration sensor, and the sensor value of the yaw rate sensor, the road-surface µ may be estimated according to the same processing as described above.

In other words, assuming that the slip angle of the car body is negligibly small, the lateral acceleration $d^2y/dt^2$, the vehicle speed V, the slip angular velocity $d\beta/dt$, and the yaw rate $d\psi/dt$ hold the following relation:

$$d\beta/dt = (d^2y/dt^2)/V - d\psi/dt \qquad (30).$$

Thus, when a running state of a vehicle is limited to the steadily running state, for example, in which an angular acceleration of a steering wheel is small, $d\beta/dt$ is nearly zero, thereby resulting in satisfying the relation: $(d^2y/dt^2)/V = d\psi/dt$. With this relation, the correlation between the lateral acceleration $d^2y/dt^2$ or the yaw rate $d\psi/dt$ and the corresponding sensor value is found.

As described above, the device for estimating a friction coefficient on road surface of a vehicle, according to the present invention has excellent advantages of minimizing influences of a resolution of a sensor, zero-point correction, noises, and the like, and of accurately estimating a friction coefficient on road surface without a vibratory steering input.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A device for a vehicle for estimating a friction coefficient of a road surface, comprising:
   first parameter-acquiring means for finding a first parameter indicating a driving behavior of the vehicle;

second parameter-acquiring means for finding a second parameter corresponding to the first parameter, with a different method from that of the first parameter-acquiring means;

correlation coefficient computing means for statistically computing a coefficient of correlation between the first and second parameters;

population correlation coefficient computing means for computing a correlation coefficient of a current population of the correlation coefficients computed by the correlation coefficient computing means based on a previously computed correlation coefficient of the population; and friction coefficient of a road surface estimating means for estimating a friction coefficient of the road surface on the basis of the correlation coefficients of the population.

2. The device for estimating a friction coefficient of a road surface according to claim 1, wherein the first and second parameters comprise wheel accelerations of left and right wheels disposed on one of a front side and a rear side of the vehicle.

3. The device for estimating a friction coefficient of a road surface according to claim 2, wherein the first and second parameters comprise values from which variation components of corresponding wheel speeds due to a driving operation of the vehicle are excluded.

4. The device for estimating a friction coefficient of a road surface according to claim 1, wherein the first parameter comprises a longitudinal acceleration computed from a driving force and a braking force of the vehicle, and the second parameter comprises a longitudinal acceleration which is one of computed from a vehicle speed and detected by a longitudinal acceleration sensor.

5. The device for estimating a friction coefficient of a road surface according to claim 1, wherein the first parameter comprises a yaw rate determined by substituting necessary parameters into an equation of state of a kinetic model of a vehicle motion, and the second parameter comprises a yaw rate detected by a yaw rate sensor.

6. The device for estimating a friction coefficient of a road surface according to claim 1, wherein the first parameter comprises a lateral acceleration determined by substituting necessary parameters into an equation of state of a kinetic model of a vehicle motion, and the second parameter comprises a lateral acceleration detected by a lateral acceleration sensor.

7. The device for estimating a friction coefficient of a road surface according to claim 1, wherein the first parameter comprises a yaw rate determined from a vehicle speed and a lateral acceleration detected by a lateral acceleration sensor, and the second parameter comprises a yaw rate detected by a yaw rate sensor.

8. The device for estimating a friction coefficient of a road surface according to claim 1, wherein the first parameter comprises a lateral acceleration determined from a vehicle speed and a yaw rate detected by a yaw rate sensor, and the second parameter comprises a lateral acceleration detected by a lateral acceleration sensor.

9. The device for estimating a friction coefficient of a road surface according to claim 1, wherein the correlation coefficient computing means computes a correlation coefficient by dividing a sum of products of deviations of the first and second parameters by a square root of a product of sums of squared deviations of the first and second parameters.

10. The device for estimating a friction coefficient of a road surface according to claim 1, wherein the friction coefficient on road surface estimating means estimates the friction coefficient on road surface in a variable manner in accordance with a running state of the vehicle.

11. The device for estimating a friction coefficient of a road surface according to claim 1, wherein the friction coefficient of the road surface estimating means sets a determining threshold value for previously determining the friction coefficient on road surface and estimates the friction coefficient on road surface by comparing the determining threshold value with the coefficient of correlation of the population.

12. The device for estimating a friction coefficient of a road surface according to claim 11, wherein the determining threshold value sets a value varying in accordance with a running state of the vehicle.

13. The device for estimating a friction coefficient of a road surface according to claim 1, wherein the population correlation coefficient computing means estimates upper and lower limits of the correlation coefficient of the population on the basis of the correlation coefficients computed by the correlation coefficient computing means, and a correlation coefficient of a current population of correlation coefficients is computed based on the previously computed correlation coefficient of the population, the upper and lower limits, and the correlation coefficients computed by the correlation coefficient computing means.

14. A device for a vehicle for estimating a friction coefficient of a road surface, comprising:

first pararmeter-acquiring means for finding a first parameter indicating a driving behavior of the vehicle;

second parameter-acquiring means for finding a second parameter corresponding to the first parameter, with a different method from that of the first parameter-acquiring means;

correlation coefficient computing means for statistically computing a coefficient of correlation between the first and second parameters;

population correlation computing means for computing a correlation coefficient of a population of the correlation coefficients computed by the correlation coefficient computing means; and friction coefficient of a road surface estimating means for estimating a friction coefficient of the road surface on the basis of the correlation coefficients of the population, wherein the population correlation coefficient computing means estimates upper and lower limits of the correlation coefficient of the population in a predetermined manner on the basis of the correlation coefficients computed by the correlation coefficient computing means, wherein the correlation coefficient of the population of a previous time is compared and limited with the upper and lower limits, and a current correlation coefficient of the population is computed based on at least a correlation coefficient computed by the correlation coefficient computing means.

15. The device for estimating a friction coefficient of a road surface according to claim 14, wherein the population correlation computing takes into account a running state of the vehicle and an acquiring state of the parameters, upon computing the correlation coefficient of the population of this time.

* * * * *